April 24, 1951  G. L. SCHWARZ  2,550,606
OIL TUBE FOR BEARINGS
Filed July 21, 1947
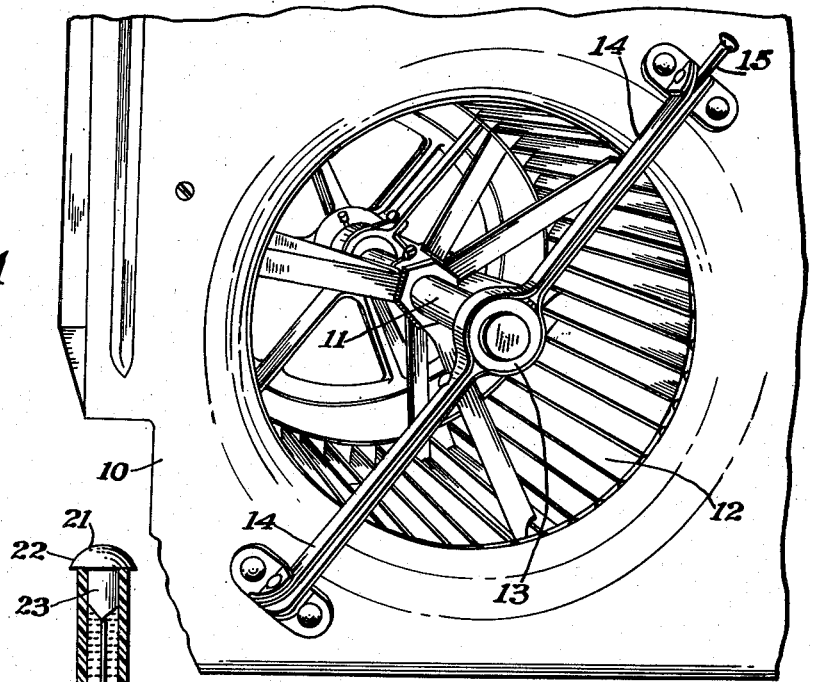
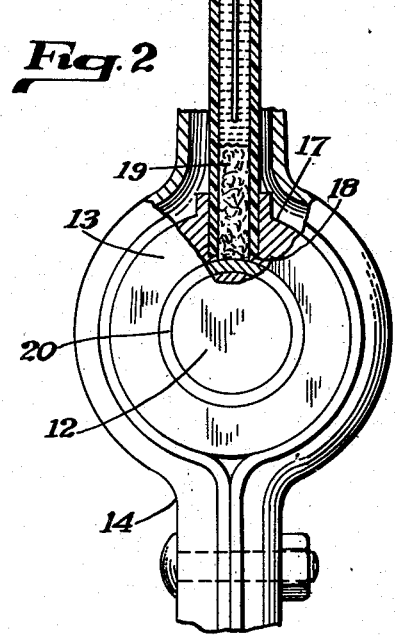
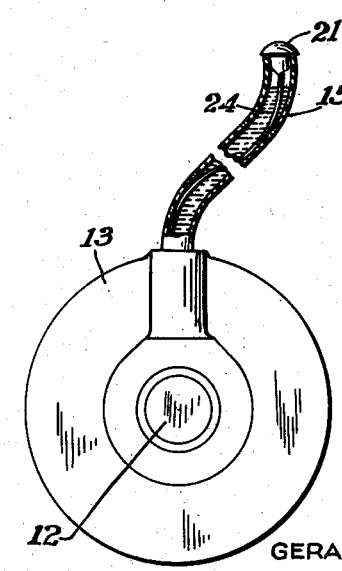
INVENTOR.
GERALD L. SCHWARZ
BY Richey & Watts
ATTORNEYS.

Patented Apr. 24, 1951

2,550,606

UNITED STATES PATENT OFFICE 2,550,606

OIL TUBE FOR BEARINGS

Gerald L. Schwarz, Cleveland, Ohio, assignor to Air Controls, Inc., Cleveland, Ohio, a corporation Application July 21, 1947, Serial No. 762,513

6 Claims. (Cl. 184—65)

This invention relates to oil tubes for bearings.

It has been common practice to supply fluid lubricant to the bearings of machines through a tube, the tube thus serving as an oil reservoir and in many cases providing more convenient access for lubrication.

This invention is directed to overcoming defects and difficulties inherent in oil tubes previously known, and accomplishes this result by the use of a flexible transparent tube fitted with a wire extending longitudinally of the tube.

By virtue of the transparency of the tube, the oil level may be readily determined by inspection and thus depletion of the oil may be readily discovered.

The provision of a flexible tube is of great advantage in many applications where the construction of the machine is such that a straight oil tube may not be practicably installed. When metal tubes are used in such cases, it becomes necessary to bend them to shape, an operation involving considerable expense; whereas the flexible oil tube of this invention readily conforms itself to the required layout.

Another common difficulty with oil tubes has been the formation of air bubbles in the tube, preventing proper filling of the tube and flow of oil to the bearing, and presenting a false appearance of a full oil tube when such is not the case. With the transparent tube of this invention, air pockets are apparent to the oiler.

Moreover, this invention contemplates the provision of a flexible wire conformable to bends in the tube, and preferably secured in a cap for the tube which serves a dual function of preventing entry of foreign matter into the tube and serving as a handle by means of which the wire may be agitated to break up and release air bubbles.

Even without agitation, however, the wire has an inherent tendency to facilitate the flow of oil and prevent the formation of air pockets.

The object of the invention is to provide an oil tube for bearings possessing the following advantages: Full visibility of the oil content of the tube, ease and economy of installation, and freedom from interference to the flow of oil from entrapped air.

While certain of these objects may be realized in the absence of others, the preferred form of the invention provides all, as will be seen from the description herein.

Referring to the drawings:

Fig. 1 is a perspective view of a centrifugal fan with the oil tube of the invention mounted thereon;

Fig. 2 is an elevation of the oil tube in association with a bearing, certain parts being shown in section, and Fig. 3 is an elevation view illustrating the application of the invention to an installation wherein the oil tube is curved, certain parts being shown in section.

As an illustration of an environment for the invention it is shown in Fig. 1 applied to a centrifugal fan comprising a casing 10, a rotor 11, a shaft 12, and a bearing 13 mounted in a bracket 14, secured to the casing. The oil tube 15 is secured in any convenient manner within the bracket 14, which is a channel section.

The tube may be made of any material which is transparent, oil resistant, and, for installations involving curvature of the tube, sufficiently flexible to accommodate such curvature, and the selection of a particular suitable material may be based on its known characteristics. One material which has been found suitable is a rubber-like polymer, a plastic sold under the trade name "Tygon." As shown in Fig. 2, the lower end of the tube 15 may be inserted in a bore 17 in the bearing housing 13, the bore being preferably counterbored to form a shoulder 18 abutting the end of the tube. Satisfactory results are obtained by simply dimensioning the bore 17 for a tight sliding fit over the tube. A plug or insert 19 of wool or other porous material fills the lower portion of the tube 15 and extends into contact with the bearing bushing 20. The upper end of the oil tube is normally closed by a cap 21 comprising a head portion 22, preferably of slightly greater diameter than the tube so that it may be readily grasped, and a body 23 dimensioned to slide into the tube. A wire 24 of such length as to extend substantially to the plug 19 is fixed in the body of the cap in any convenient manner.

In order to replenish the oil supply the cap is lifted and oil is introduced in the customary manner. During this operation the wire 24 will ordinarily lie along the wall of the tube and promote the flow of oil through the tube, the capillary action of the oil tending to break the meniscus of an air bubble and thus insure complete filling of the tube. In the event an air pocket should prove obdurate, the wire may be agitated to break up the pocket and facilitate complete filling of the tube with oil.

The wire 24 should be of sufficiently small diameter to accommodate itself to curvature of the tube as illustrated in Fig. 3. Preferably for curved installations the tube should be of such flexibility as to accommodate itself to the installation although a tube which requires heating or other operations to bend it to shape may be employed.

It will be seen that the invention eliminates the need for threading the oil tube and tapping the bearing bracket, provides full visibility of the oil supply, and sufficient oil capacity to minimize the necessity for replenishing the oil. The tube 15 eliminates need for boring an oil recess in the bearing body and wool packing for the same. In addition, the head of oil in the tube provides a slight positive pressure to feed the oil to the bearing and eliminates dependence upon capillary action. The tube is easy to fill and may be inspected to ascertain that it is completely filled. A bi-metal disk may be inserted in the bottom of the tube 15 to regulate oil flow by the temperature of the bearing.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. Means for supplying oil to a bearing comprising a flexible transparent tube adapted to be coupled at one end to the bearing and to be filled with oil at the other end, a wire extending through the major part of the tube, and means to agitate the wire.

2. Means for supplying oil to a bearing formed with an oil hole comprising a flexible transparent tube adapted to be inserted directly in the oil hole and to extend upwardly therefrom, a wire extending through the major portion of the tube, and means to agitate the wire.

3. Means for supplying oil to a bearing comprising a flexible transparent tube adapted to be inserted at one end into the bearing and to be filled with oil at the other end, means in the tube for agitating the oil therein, and a porous plug in the tube at the bearing end thereof and beyond the agitating means.

4. Means for supplying oil to a bearing comprising a flexible tube adapted to be inserted in an oil hole in the bearing and to extend upwardly therefrom, a cap for the upper end of the tube, and a wire fixed to the cap normally extending substantially through the tube, and a porous plug in the tube at the bearing end thereof and beyond the end of said wire.

5. Means for supplying oil to a bearing comprising a flexible transparent tube adapted to be inserted in an oil hole in the bearing and to extend upwardly therefrom, a porous plug in the bearing end of the tube, a cap for the upper end of the tube, and a wire fixed to the cap and normally extending through the tube substantially to the plug.

6. Means for supplying oil to a bearing formed with an oil hole therein comprising a transparent flexible tubular oil reservoir, one end of the oil reservoir being dimensioned for a close fit in the said oil hole, the other end of the reservoir being open to atmospheric pressure, an elongate flexible agitating element disposed within the tube and extending through the major part of the length thereof, and a hand grip on one end of the said agitating element adapted to close the open end of the tube against the entrance of foreign matter.

GERALD L. SCHWARZ.

REFERENCES CITED

The following references are of record in the file of this patent:

UNITED STATES PATENTS

| Number | Name | Date |
|---|---|---|
| 508,485 | Mowrer | Nov. 14, 1893 |
| 839,787 | Shobert | Dec. 25, 1906 |
| 1,250,036 | Shipeley | Dec. 11, 1917 |
| 1,665,964 | Koehler | Apr. 10, 1928 |

FOREIGN PATENTS

| Number | Country | Date |
|---|---|---|
| 335,845 | France | Dec. 18, 1903 |